United States Patent
Dultz et al.

(10) Patent No.: US 6,501,894 B2
(45) Date of Patent: Dec. 31, 2002

(54) PLASTIC OPTICAL FIBER

(76) Inventors: Wolfgang Dultz, Marienberger Strasse 37, D-65936 Frankfurt am Main (DE); Walter Heitmann, Freiherr-vom-Stein-Strasse 41, D-64401 Gross-Bieberau (DE); Erich Becker, Albert-Schweitzer-Strasse 5b, D-64342 Seeheim-Jugenheim (DE)

( * ) Notice: Subject to any disclaimer, the term of this patent is extended or adjusted under 35 U.S.C. 154(b) by 0 days.

(21) Appl. No.: 09/789,644

(22) Filed: Feb. 22, 2001

(65) Prior Publication Data

US 2001/0024558 A1 Sep. 27, 2001

Related U.S. Application Data

(63) Continuation of application No. PCT/EP99/05920, filed on Aug. 12, 1999.

(30) Foreign Application Priority Data

Aug. 25, 1998 (DE) .......................... 198 38 499
Oct. 27, 1998 (DE) .......................... 198 49 383

(51) Int. Cl.[7] .................................. G02B 6/02
(52) U.S. Cl. ........................ 385/128; 385/124
(58) Field of Search ................ 385/122–128, 385/140

(56) References Cited

U.S. PATENT DOCUMENTS

| | | | | |
|---|---|---|---|---|
| 4,161,500 A | * | 7/1979 | Schleinitz et al. | 264/1 |
| 4,877,306 A | | 10/1989 | Kar | 350/96.33 |
| 4,919,513 A | | 4/1990 | Nakakuki et al. | 350/96.33 |
| 5,319,731 A | | 6/1994 | Eastman | 385/115 |
| 5,608,835 A | | 3/1997 | Ono et al. | 385/126 |

FOREIGN PATENT DOCUMENTS

| | | |
|---|---|---|
| EP | 0 116 980 A1 | 8/1984 |
| EP | 0 488 390 A1 | 6/1992 |
| EP | 0 783 117 A2 | 7/1997 |
| JP | 56101108 | 8/1981 |

OTHER PUBLICATIONS

Jarriel et al. A Simple Method for Optimizing Radar Absorbent Material Coatings on HF Rope Antennas for the Increased Attenuation of Unwanted Reflections.*

* cited by examiner

*Primary Examiner*—Phan T. H. Palmer

(57) ABSTRACT

A plastic optical fiber having a low-loss, light-guiding plastic core surrounded by an inner, low-loss layer of a smaller refractive index and by an outer, stronger light-absorbing layer. The low-loss, light-guiding plastic core can also be surrounded by a light-absorbing layer.

7 Claims, No Drawings

PLASTIC OPTICAL FIBER

This application is a continuation of international application number PCT/EP99/05920, filed Aug. 12, 1999, the content of which is incorporated herein by reference.

The invention relates to a plastic optical fiber.

FIELD OF THE INVENTION

Plastic optical fibers (POF) represent a light wave transmission medium well suited for a broad application in telecommunications. For making these fibers mainly polymer plastics such as polymethyl methacrylate (PMMA) or polystrene (PS) are employed as the core material. As the sheathing substances fluorinated polymers, silicones or PMMA are put to use. Plastic optical fibers, unlike those of glass, can be produced with large diameters. Plastic fibers have high numerical apertures. They feature a high ultimate strength and permit facilitated handling. Furthermore, connecting and termination systems are simple to make since their precision requirements are low. The core diameter of a POF corresponds practically to the outer diameter whilst in usual glass fibers it approaches the wavelength of the light to be transmitted. According to H.Hultzsch: "Optische Telekommunikationssysteme", Damm-Verlag, Gelsenkirchen POF diameters are typically of the order of 1 mm.

BACKGROUND

Due to the large core diameters and numerical apertures plastic fibers guide a large number of so-called modes, i.e. light bundles travelling through the waveguides at various angles. The greater the angle the higher the order number of the modes and the longer the light path in the waveguide the higher the number of reflections in the junction between core and sheath with increasing depth of penetration of the light into the sheath.

Data are transmitted in such light guides in the form of a light pulses. Due to the differences in the transit time between the modes the light pulses are strongly dispersed (mode dispersion).

Hitherto only so-called step-index fibers are available which permit, at best, a bandwidth of 170 MHz for an overall length of 100 m. These values are, however, too low for future wideband networks.

To enhance the transmission bandwidth work has been going on since many years in developing gradient-index plastic fibers comprising instead of the step-index profile a parabolic profile of the refractive index in the fiber core and thus to compensate the differences in the transit time between the modes (see also H.Hultzsch: "Optische Telekommunikations-systeme", Damm-Verlag, Gelsenkirchen). The methods for producing these gradient-index fibers are, however, complicated and expensive. Hitherto they are not commercially viable and there is no prospect of when this type of fiber could be produced cost-effectively.

SUMMARY OF THE INVENTION

The object of the present invention is to define a plastic optical fiber which is relatively simple and cost-effective to produce and comprises a lower mode dispersion than conventional step-index fibers.

This object is achieved in that the core of the fiber comprised of a low-attenuation, light-guiding plastic is surrounded by an inner, low-attenuation layer of a smaller refractive index and by an outer, stronger light-absorbing layer. The present invention describes a new type of step-index plastic fibers which can be produced by existing systems, it preferably being provided for that the thickness of the low-attenuation layer is in the range 0.3 $\mu$m to 3 $\mu$m.

As an alternative thereto it is proposed to achieve the object in that the core of the fiber comprised of a low-attenuation light-guiding plastic is surrounded by a light-absorbing layer so that the intermediate layer can be eliminated in cases when the fiber satisfies the optical requirements.

BRIEF DESCRIPTION OF PREFERRED EMBODIMENT

When a light cone is beamed into the fiber in accordance with the invention which fills out the numerical aperture of the fiber, then in passing through the fiber the higher modes are absorbed due to their greater penetration depth in the sheath and the higher number of reflections. At the end of the fiber a narrow light cone emerges having a substantially reduced aperture, it containing only the inner modes of small order number, thus resulting in a substantially wider transmission bandwidth but more lossy. Since, however, the development of new low-attenuation plastics is being advanced, this drawback is negligable. Apart from this the attenuation currently achievable with plastic fibers fully satisfies the requirements of short to medium-haul transmission lines.

When, by contrast, a narrow light cone is beamed into the fiber, so that only part of the aperture is filled out, part of the light path is converted at curvatures or due to core inhomogenities into higher order modes which, in turn, are absorbed due to their high penetration depth in the sheath and the higher number of reflections. As a result the light cone remains practically unchanged, it continuing to consist predominantly of axially approximate modes and featuring a low mode dispersion. In this arrangement the losses due to the absorption of the higher modes is low since the conversion into higher modes remains limited.

Error-correcting the fiber in accordance with the invention may also be put to use for gradient-index fibers so as to reduce higher order modes resulting from production errors and additional dispersion caused thereby.

It may furthermore be provided for that the light-absorbing layer is thicker than 1 $\mu$m, it being good practice when the attenuation of the light-absorbing layer is in the range $10^4$ dB/km to $10^7$ dB/km.

The high attenuation of the light-absorbing layer is attained by doping the plastic matrix with cobalt, chromium, manganese or iron, whereby doping with rare earth oxides or other substances exhibiting high absorption in the wavelength range of the light to be transmitted is also possible. Doping 2 ppm cobalt ions results in an attenuation of 10,000 dB/km for a wavelength of 650 nm of the light to be transmitted.

For fabricating the new fiber type, known devices can be modified so that the substances provided for producing the fiber core and the layers are molded concentrically by a concentric array of three spinning dies in an extruder.

Hitherto, plastic fibers are also drawn from preforms. Preforms are rods having a typical diameter of a few centimeters and roughly 1 meter long. The end of the preform is heated for drawing the fiber. For producing a fiber in accordance with the invention by drawing, it is provided for that a plastic rod of the material provided for producing the fiber core is surrounded by a sleeve of the material provided for producing the light-absorbing layer, the interspace between the rod and the sleeve being filled out with the material provided for producing the low-attenuation layer and drawing a fiber from the resulting blank.

To profit from the advantages of the invention it is also possible to engineer the so-called "last mile" (immediately prior to the receiving end) of the optical transmission line in a fiber in accordance with the invention whilst the remainder is engineered in a conventional fiber, the terminal of the transmission line then acting as a mode filter.

What we claimed is:

1. An optical fiber comprising a low-attenuation, light-guiding core and a light-absorbing layer surrounding the core, the core of the optical fiber consisting of a low-attenuation plastic and having a diameter permitting the transmission of both low-order modes and a plurality of higher order modes; wherein the light-absorbing layer is capable of absorbing only the higher orders of the modes dispersing in the core and is doped with oxides of rare earth elements to enhance its attenuation.

2. An optical fiber comprising a low-attenuation, light-guiding core and light-absorbing layer surrounding the core, the core of the optical fiber consisting of a low-attenuation plastic and having a diameter permitting the transmission of both low-order modes and a plurality of higher order modes; wherein the light-absorbing layer is capable of absorbing only the higher orders of the modes dispersing in the core and is doped with metal ions to enhance its attenuation.

3. An optical fiber comprising a low-attenuation, light-guiding core and light-absorbing layer surrounding the core, the core of the optical fiber consisting of a low-attenuation plastic and having a diameter permitting the transmission of both low-order modes and a plurality of higher order modes; wherein the light-absorbing layer is capable of absorbing only the higher orders of the modes dispersing in the core.

4. The optical fiber as set forth in claim 3, wherein the light-absorbing layer is thicker than 1 $\mu$m.

5. The optical fiber as set forth in claim 3, wherein the attenuation of the light-absorbing layer is in the range $10^4$ dB/km to $10^7$ dB/km.

6. The optical fiber as set forth in claim 3, wherein the light-absorbing layer is doped with substances exhibiting high absorption in the wavelength range of the light to be transmitted so as to influence its attenuation.

7. A transmission line comprising at least one optically conducting fiber, wherein an optical fiber as set forth in claim 3 is arranged in the "last mile".

* * * * *